United States Patent
Nguyen et al.

(10) Patent No.: US 10,891,137 B2
(45) Date of Patent: Jan. 12, 2021

(54) MAKING AVAILABLE INPUT/OUTPUT STATISTICS FOR DATA SETS OPENED DURING INITIAL PROGRAM LOAD

(71) Applicant: International Business Machines Corporation, Armonk, NY (US)

(72) Inventors: Tan Q. Nguyen, San Jose, CA (US); John R. Paveza, Morgan Hill, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 32 days.

(21) Appl. No.: 16/034,627

(22) Filed: Jul. 13, 2018

(65) Prior Publication Data
US 2020/0019409 A1 Jan. 16, 2020

(51) Int. Cl.
*G06F 9/4401* (2018.01)
*G06F 9/445* (2018.01)
*G06F 9/455* (2018.01)
*G06F 3/06* (2006.01)

(52) U.S. Cl.
CPC ........ *G06F 9/4403* (2013.01); *G06F 9/44505* (2013.01); *G06F 3/061* (2013.01); *G06F 3/0667* (2013.01); *G06F 9/4416* (2013.01); *G06F 2009/45579* (2013.01)

(58) Field of Classification Search
CPC ........... G06F 2009/45579; G06F 3/061; G06F 3/0667; G06F 9/4416
See application file for complete search history.

(56) References Cited

U.S. PATENT DOCUMENTS

| | | | |
|---|---|---|---|
| 4,675,814 A | 6/1987 | Murai et al. | |
| 5,687,073 A | 11/1997 | Kishimoto | |
| 6,073,232 A | 6/2000 | Kroeker et al. | |
| 6,269,422 B1* | 7/2001 | McDonald | G11B 15/026 711/111 |
| 8,261,050 B2 | 9/2012 | Bavaria et al. | |
| 8,352,716 B1* | 1/2013 | Chatterjee | G06F 9/4416 711/147 |
| 8,775,591 B2 | 7/2014 | Bobak et al. | |
| 8,914,665 B2 | 12/2014 | Evans et al. | |
| 9,229,732 B2 | 1/2016 | Tsui et al. | |
| 9,262,274 B2 | 2/2016 | Dunshea et al. | |
| 10,037,161 B2 | 7/2018 | Imaeda | |
| 2001/0039597 A1* | 11/2001 | Senator | G06F 11/3485 719/325 |
| 2013/0311740 A1* | 11/2013 | Watanabe | G06F 3/061 711/165 |
| 2014/0372346 A1* | 12/2014 | Phillipps | G06N 20/00 706/12 |
| 2015/0006787 A1* | 1/2015 | Liu | G06F 3/0604 711/103 |
| 2020/0042194 A1 | 2/2020 | Hashimoto | |

* cited by examiner

Primary Examiner — Terrell S Johnson
(74) Attorney, Agent, or Firm — Cantor Colburn LLP; William Kinnaman

(57) ABSTRACT

A computer-implemented method of storing I/O statistics of a data set during initialization of a system. The computer-implemented method includes receiving during system initialization, by a processor, a data extent block associated with the data set. Next, the method identifies during system initialization, by the processor, a data set statistics block linked to an identified data set block, and stores, by the processor, the I/O statistics in the data set statistics block.

14 Claims, 4 Drawing Sheets

MAKING AVAILABLE INPUT/OUTPUT STATISTICS FOR DATA SETS OPENED DURING INITIAL PROGRAM LOAD

BACKGROUND

The present invention relates to data sets, and more specifically, to making available input/output (I/O) statistics for data sets opened during initial program load ("IPL").

The ability to capture and report I/O statistics on a file ("data set") basis allows an installation to monitor the performance of an application as well as diagnose I/O congestion. There are important data sets the system is unable to capture and report I/O statistics for because they are accessed while the system is initializing ("IPLing"). These data sets are never closed. They continue to be accessed for as long as the system is operational.

SUMMARY

Embodiments of the present invention are directed to a computer-implemented method of storing I/O statistics of a data set opened during initialization of a system. The computer-implemented method includes receiving during system initialization, by a processor, a data extent block associated with the data set. The method builds a data set block for the data set that is opened during system initialization and adds the data set block to a chained list of data set blocks. Next, the method identifies during system initialization, by the processor, a data set statistics block linked to the identified data set block, and stores, by the processor, the I/O statistics in the data set statistics block.

Embodiments of the present invention further provide a system that includes a memory and a processor communicatively coupled to the memory. The processor is operable to execute instructions stored in the memory. The instructions cause the processor to receive during system initialization a data extent block associated with a data set. The processor creates during system initialization a data set statistics block and links it to a created data set block, and stores the I/O statistics in the data set statistics block.

An additional embodiment provides a computer program product for storing I/O statistics of a data set during initialization of a system. The computer program product includes a computer readable storage medium having program instructions embodied therewith, the program instructions executable by a computer. The computer program product causes the computer to perform a method. The method includes receiving during system initialization, by a processor, a data extent block associated with the data set. The method identifies during system initialization, by the processor, a data set statistics block linked to an identified data set block and stores, by the processor, the I/O statistics in the data set statistics block.

DETAILED DESCRIPTION

Figure 1:
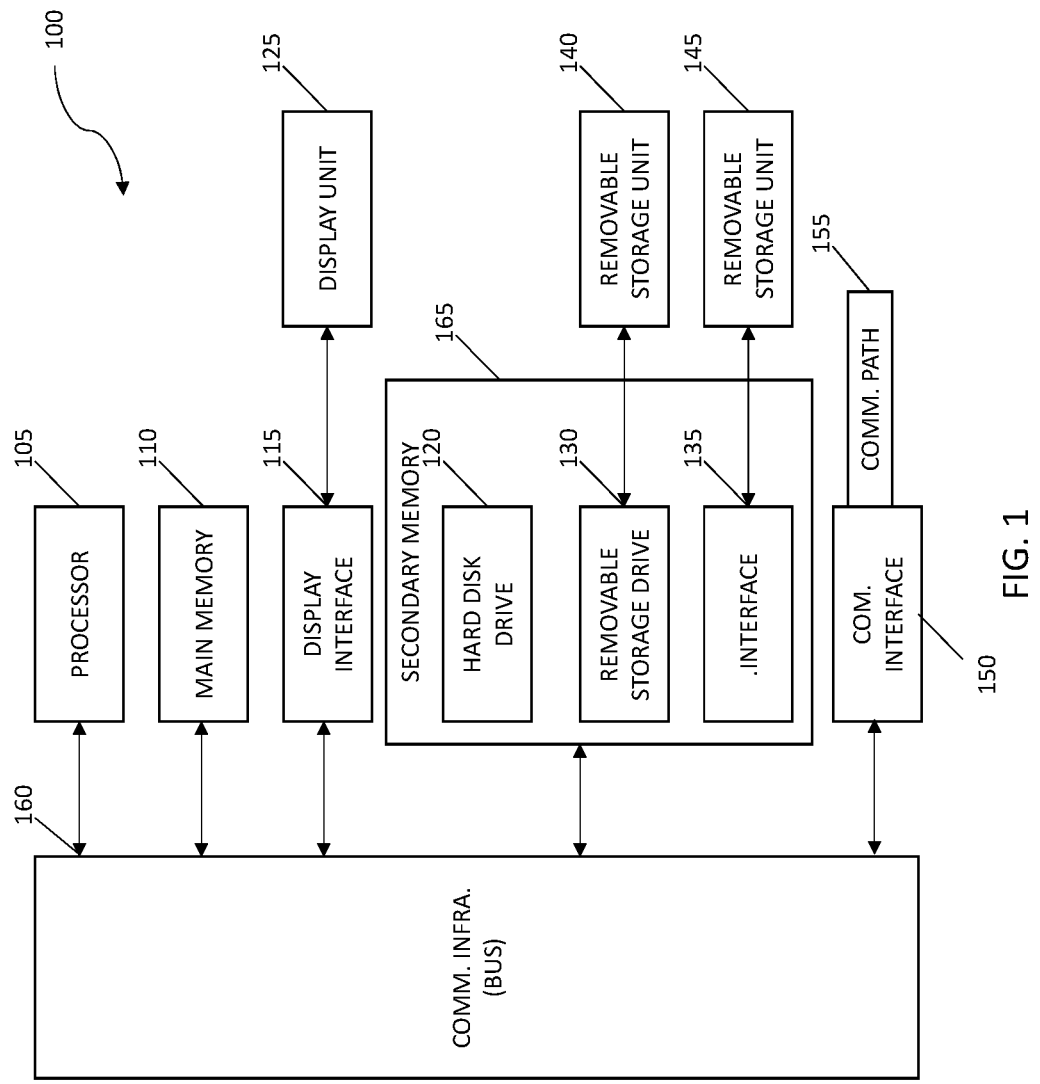
FIG. 1 depicts details of an exemplary computing system capable of implementing aspects of the invention.

Various embodiments of the present invention are described herein with reference to the related drawings. Alternative embodiments of the invention can be devised without departing from the scope of this invention. It is noted that various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments of the invention or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments of the invention whether or not explicitly described.

When data sets are opened, a Data Extent Block ("DEB") is created to identify the block range(s) that can be accessed. The DEB may also include the address of a Data Set Statistics Block ("DSSB"). A DSSB contains response time measurements for I/O operations that occur over time for this data set. For those data sets opened during IPL, a DSSB cannot be created because the Storage Management Subsystem ("SMS") address space is not ready.

A second issue is that the DEB that is built is "basic", meaning it contains a minimum amount of information about the data set. A basic DEB does not include the address of the DSSB. For that, an "extended" DEB must be used. It is problematic to modify the extended DEB. These issues prevent the system from accumulating response time metrics for I/O to these data sets.

To overcome these issues, a new structure that will provide the necessary linkage to associate a DEB and a DSSB is defined. With this new structure, the I/O subsystem can collect and report I/O response time metrics on a data set basis. During IPL, the system builds a basic DEB and DSSB block. Because this DEB does not include the DSSB address, a new structure (called a "Pre-SMS Data Set Block") to link the DEB with the DSSB is defined. When an I/O Driver builds the I/O request, it will invoke a new system service that will return the address of the DSSB for a given DEB. It does this by searching a chain of Pre-SMS Data Set Blocks. When the I/O completes, the system captures response time metrics, e.g., connect and disconnect, and saves these in the DSSB, just like it does for data sets with an extended DEB that points directly to a DSSB. On an interval basis, these time metrics are written as data records, for example, System Management Facility ("SMF") 42 records.

Thus, the use of a Pre-SMS Data Set Block to link a DEB to a DSSB allows I/O statistics to be saved in a DSSB without having to modify the extended DEB, or DEB Extension, data set. This overcomes the deficiencies identified as it allows the saving of I/O statistics during initialization, or IPL.

FIG. 1 depicts a high level block diagram computer system 100, which can be used to implement one or more aspects of the present invention. More specifically, computer system 100 can be used to implement some hardware components of embodiments of the present invention. Although one exemplary computer system 100 is shown, computer system 100 includes a communication path 155, which connects computer system 100 to additional systems (not depicted) and can include one or more wide area networks (WANs) and/or local area networks (LANs) such as the Internet, intranet(s), and/or wireless communication network(s). Computer system 100 and additional system are in communication via communication path 155, e.g., to communicate data between them.

Computer system 100 includes one or more processors, such as processor 105. Processor 105 is connected to a communication infrastructure 160 (e.g., a communications bus, cross-over bar, or network). Computer system 100 can include a display interface 115 that forwards graphics, text, and other data from communication infrastructure 160 (or from a frame buffer not shown) for display on a display unit 125. Computer system 100 also includes a main memory 110, preferably random access memory (RAM), and can also include a secondary memory 165. Secondary memory 165 can include, for example, a hard disk drive 120 and/or a removable storage drive 130, representing, for example, a floppy disk drive, a magnetic tape drive, or an optical disk drive. Removable storage drive 130 reads from and/or writes to a removable storage unit 140 in a manner well known to those having ordinary skill in the art. Removable storage unit 140 represents, for example, a floppy disk, a compact disc, a magnetic tape, or an optical disk, etc. which is read by and written to by removable storage drive 130. As will be appreciated, removable storage unit 140 includes a computer readable medium having stored therein computer software and/or data.

In alternative embodiments, secondary memory 165 can include other similar means for allowing computer programs or other instructions to be loaded into the computer system. Such means can include, for example, a removable storage unit 145 and an interface 135. Examples of such means can include a program package and package interface (such as that found in video game devices), a removable memory chip (such as an EPROM, or PROM) and associated socket, and other removable storage units 145 and interfaces 135 which allow software and data to be transferred from the removable storage unit 145 to computer system 100.

Computer system 100 can also include a communications interface 150. Communications interface 150 allows software and data to be transferred between the computer system and external devices. Examples of communications interface 150 can include a modem, a network interface (such as an Ethernet card), a communications port, or a PCM-CIA slot and card, etcetera. Software and data transferred via communications interface 150 are in the form of signals which can be, for example, electronic, electromagnetic, optical, or other signals capable of being received by communications interface 150. These signals are provided to communications interface 150 via communication path (i.e., channel) 155. Communication path 155 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 110 and secondary memory 165, removable storage drive 130, and a hard disk installed in hard disk drive 120. Computer programs (also called computer control logic) are stored in main memory 110 and/or secondary memory 165. Computer programs can also be received via communications interface 150. Such computer programs, when run, enable the computer system to perform the features of the present invention as discussed herein. In particular, the computer programs, when run, enable processor 105 to perform the features of the computer system. Accordingly, such computer programs represent controllers of the computer system.

Many of the functional units described in this specification have been labeled as modules. Embodiments of the present invention apply to a wide variety of module implementations. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, comprise the module and achieve the stated purpose for the module.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 2:
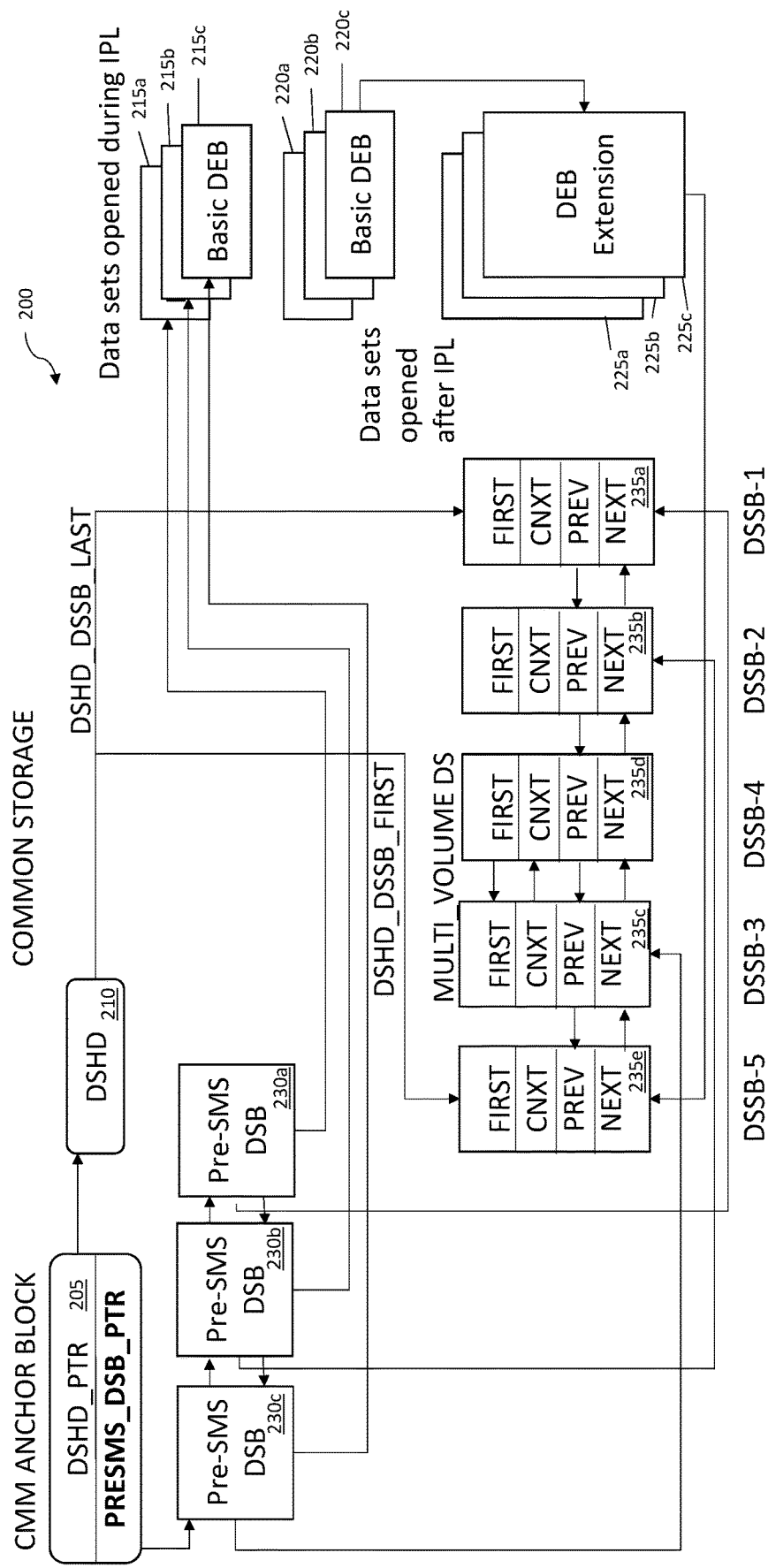
FIG. 2 illustrates the use of Pre-SMS Data Set Blocks to link a basic DEB with a DSSB in accordance with one or more embodiments.

FIG. 2 illustrates the use of Pre-SMS Data Set Blocks ("Pre-SMS DSBs") to link a basic DEB with a DSSB in accordance with one or more embodiments. After initialization, or IPL, DEBs 220 are created that point to DEB Extensions 225. DEBs determine where data sets are stored in common storage and relieve the burden on the user to figure out where to place data sets.

The DEB Extension data sets 225 can be linked to a DSSB, such as DSSB 235*e* that contains I/O statistics about the performance of the I/O subsystem. These I/O statistics may be collected periodically, for example, every 30 minutes, and saved as SMF records in the DSSB. While this DEB functionality, in cooperation with the DEB Extension, operates satisfactorily after initialization, there has not previously been any method or structure to link a basic DEB with a DSSB during initialization. This was an important deficiency as many data sets may be open and stay open for months during IPL. As these data sets may never be closed, there is no opportunity to create the DEB Extension needed to link to a DSSB. In the absence of a DEB Extension, there has been no way to link a DEB to a DSSB.

Exemplary embodiments disclosed herein provide for a Pre-SMS DSB that links a basic DEB to a DSSB. During IPL, basic DEBs 215*a-c* may be opened. Because they are being opened during IPL, DEB Extension blocks are unavailable. To overcome this each basic DEB 215*a-c* may be linked to a respective Pre-SMS DSB 20*a-c*. The Pre-SMS DSBs 20*a-c* are chained together through links. For example, Pre-SMS DSB 230*a* links to Pre-SMS DSB 230*b* which is lined to Pre-SMS DSB 230*c*. Each Pre-SMS DSB also links to a respective DSSB. For example, Pre-SMS DSB 230*a-c* are linked to DSSB 235*a-c*. Thus, through the use of the links in the Pre-SMS DSB a basic DEB is connected to an associated DSSB. Therefore, I/O statistics may be written to and read from a DSSB for each basic DEB, allowing I/O statistics to be captured during IPL. A pointer in a Common Measurement Manager ("CMM") Anchor Block 205 points to a first Pre-SMS DSB 230*c*. By following this pointer, a system service can search through the chain of Pre-SMS DSBs to store or retrieve I/O statistical data from the appropriate DSSB.

For example, if basic DEB 215a performs an I/O operation, a system service will examine the PreSMS_DSB_PTR pointer that points to the first Pre-SMS DSB 230c. The system service will traverse the chain of Pre-SMS DSBs until it finds a Pre-SMS DSB that links to basic DEB 215a. In this example, that is Pre-SMS DSB 230a. Then, the system service will follow the link from Pre-SMS DSB 230a to DSSB 235a to write I/O statistics data to DSSB 235a.

To read statistics about a basic DEB, for example DEB 215b, the system service will examine PRESMS_DSB_PTR in CMM Anchor Block 205 and follow that pointer to Pre-SMS DSB 230c. The system service will traverse the chain of Pre-SMS DSBs until it finds Pre-SMS DSB 230b which points to basic DEB 215b. At that point, the system service examines the pointer to DSSB 235b to read I/O statistics data from the DSSB.

Returning to the CMM Anchor Block 205, a DSHD, or Data Set Header, pointer points to the Data Set Header ("DSHD") 210 which has information about the address space. Within the DSHD are two pointers: DSHD_DSSB_FIRST that points to the first DSSB and DSHD_DSSB_LAST that points to the last DSSB.

Returning to an examination of the DSSBs, each DSSB containers a NEXT pointer to the next DSSB and a PREV pointer to the previous DSSB. They also contain a FIRST pointer and a CNXT pointer that are used to point to DSSBs in situations of multiple volume data sets. For example, basic DEB 215c is associated with a multi-volume data set, so it has associated DSSB 235c AND associated DSSB 235d. The Pre-SMS DSB 230c that is associated with basic DEB 215c only needs to point to a single one of the DSSBs (DSSB-3) in order to get information from DSSB-3 and DSSB-4.

In summary, the user of the Pre-SMS DSB permits linking a basic DEB opened during initialization to a DSSB in order to read and write I/O statistics from and to the DSSB during initialization. Thus, important statistics about I/O performance may be stored and retrieved.

Figure 3:
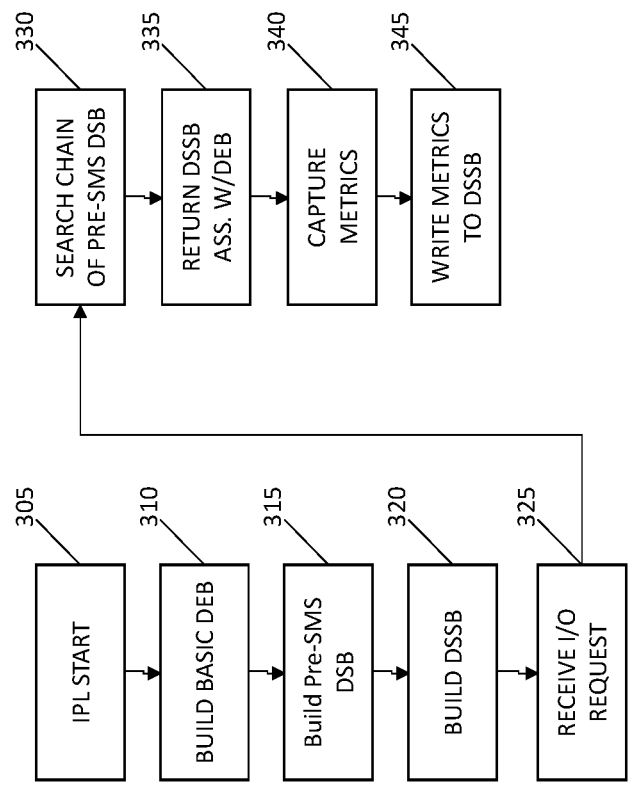
FIG. 3 illustrates an exemplary flowchart of a write I/O statistics system service in accordance with one or more embodiments.

FIG. 3 illustrates an exemplary flowchart of a write I/O statistics system service in accordance with one or more embodiments. Initialization, also known as IPL, is started by a processor (stage 305). A basic DEB is created during IPL by the processor (stage 310). A Pre-SMS DSB is built by the processor and the Pre-SMS DSB is linked to the DEB by the processor (stage 315). The Pre-SMS DSB is linked to a previous Pre-SMS DSB if one exists. A DSSB is built by the processor and the Pre-SMS DSB links to the built DSSB by the processor (stage 320).

This new DSSB is linked to a previous DSSB if one exists. When an I/O driver builds an I/O request, the processor receives the I/O request (stage 325). The processor searches through the chain of Pre-SMS DSB until it finds a link to the matching basic DEB (stage 330). Once that is found, the processor identifies the DSSB that is associated with the basic DEB (stage 335). When the I/O completes, the processor captures response time metrics (stage 340) and stores those metrics in the DSSB (stage 345)>

Figure 4:
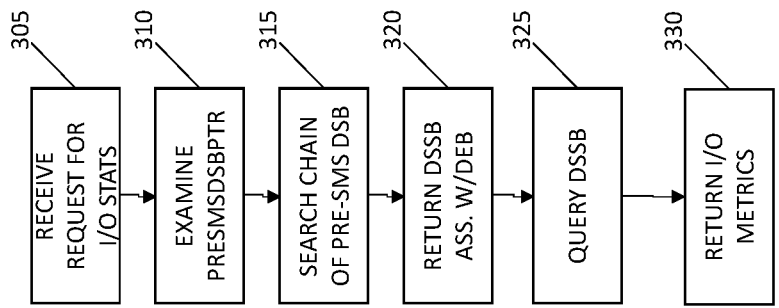
FIG. 4 illustrates an exemplary flowchart of a read I/O statistics system service in accordance with one or more embodiments.

FIG. 4 illustrates an exemplary flowchart of a read I/O statistics system service in accordance with one or more embodiments. A processor receives a request for I/O stats for a basic DEB (stage 305). The processor examines the PRESMS_DSB_PTR pointer to find a first Pre-SMS DSB (stage 310). A chain of Pre-SMS DSBs is searched for a matching basic DEB (stage 315). The processor identifies a DSSB associated with the basic DEB (stage 320). The processor examines the DSSB to look for the I/O metrics saved therein (stage 325). The processor then returns the I/O metrics from the DSSB associated with the basic DEB (stage 330).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

It will be understood that those skilled in the art, both now and in the future, may make various improvements and enhancements which fall within the scope of the claims which follow. The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of storing input/output (I/O) statistics of a data set opened during initialization of a system, comprising:
   receiving during system initialization, by a processor, a data extent block associated with the data set;

building, by the processor, a data set block for the data extent block, the building comprising adding the data set block to a chained list of data set blocks;

creating, during system initialization, by the processor, a data set statistics block for the data extent block, the data set statistics block linked to the data extent block via the data set block; and storing, by the processor, the I/O statistics of the data set in the data set statistics block, wherein the data set statistics block is accessed via the data set block and the accessing includes traversing the chained list to locate the data set block for the data extent block.

2. The computer-implemented method of claim 1, further comprising linking, by the processor, the data set block to the data extent block.

3. The computer-implemented method of claim 1, further comprising linking, by the processor, the data set block to the data set statistics block.

4. The computer-implemented method of claim 1, further comprising linking, by the processor, the data set block to a previous data set block in the chained list.

5. The computer-implemented method of claim 1, further comprising linking, by the processor, the data set statistics block to a previous data set statistics block.

6. The computer-implemented method of claim 1, further comprising linking, by the processor, an anchor block to the data set block.

7. A system comprising:

a memory;

a processor communicatively coupled to the memory, the processor operable to execute instructions stored in the memory, the instructions causing the processor to:

receive during system initialization a data extent block associated with a data set opened during system initialization;

build a data set block for the data extent block, the building comprising adding the data set block to a chained list of data set blocks;

create during system initialization a data set statistics block for the data extent block, the data set statistics block linked to the data extent block via the data set block; and store input/output (I/O) statistics of the data set in the data set statistics block, wherein the data set statistics block is accessed via the data set block and the accessing includes traversing the chained list to locate the data set block for the data extent block.

8. The system of claim 7, wherein the instructions further cause the processor to link the data set block to the data extent block.

9. The system of claim 7, wherein the instructions further cause the processor to link the data set block to the data set statistics block.

10. The system of claim 7, wherein the instructions further cause the processor to link the data set block to a previous data set block in the chained list.

11. The system of claim 7, wherein the instructions further cause the processor to link the data set statistics block to a previous data set statistics block.

12. The system of claim 7, wherein the instructions further cause the processor to link an anchor block to the data set block.

13. A computer program product for storing input/output (I/O) statistics of a data set opened during initialization of a system, the computer program product comprising a computer readable storage medium having program instructions embodied therewith, the program instructions executable by a computer, to cause the computer to perform a method comprising:

receiving during system initialization, by a processor, a data extent block associated with the data set;

building, by the processor, a data set block for the data extent block, the building comprising adding the data set block to a chained list of data set blocks;

creating during system initialization, by the processor, a data set statistics block for the data extent block, the data set statistics block linked to the data extent block via the data set block; and storing, by the processor, the I/O statistics of the data set in the data set statistics block, wherein the data set statistics block is accessed via the data set block and the accessing includes traversing the chained list to locate the data set block for the data extent block.

14. The computer program product of claim 13, wherein the program instructions further cause the computer to link the data set block to the data extent block.

* * * * *